June 19, 1928.
A. L. PICKERING
GAS REGULATOR
Filed Dec. 24, 1925
1,674,625
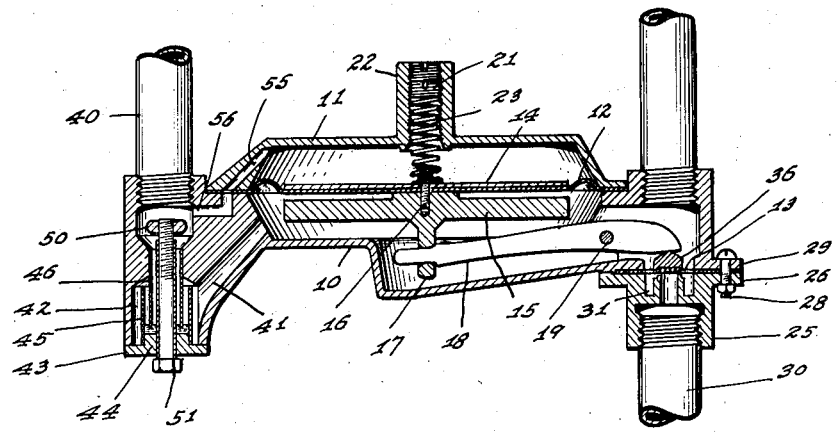
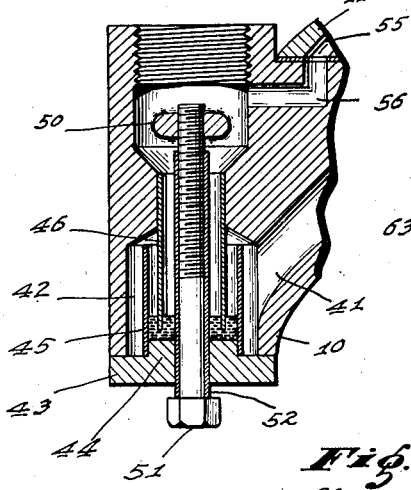
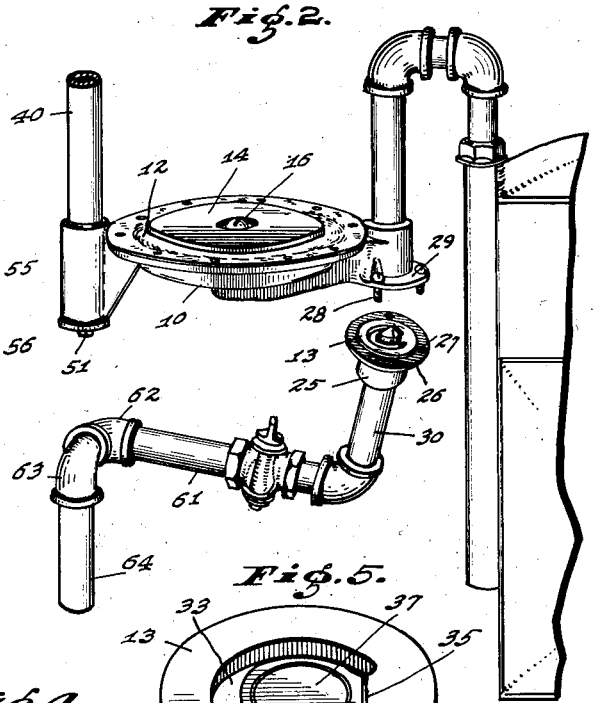
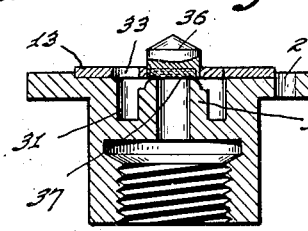
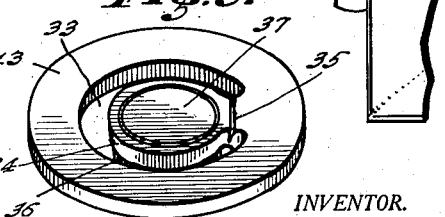
INVENTOR.
ARTHUR L. PICKERING,
BY
ATTORNEY.

Patented June 19, 1928.

1,674,625

UNITED STATES PATENT OFFICE.

ARTHUR L. PICKERING, OF ANDERSON, INDIANA; FORREST M. PICKERING, ADMINISTRATOR OF SAID ARTHUR L. PICKERING, DECEASED, ASSIGNOR TO ECONOMY GOVERNOR COMPANY, OF ANDERSON, INDIANA, A CORPORATION OF INDIANA.

GAS REGULATOR.

Application filed December 24, 1925. Serial No. 77,481.

It is the object of my invention to produce a gas pressure regulator in which the parts, particularly the valve and its seat, are readily accessible for purposes of cleaning or replacement. A further object of my invention is to provide a liquid seal of an improved type in which means are provided for preventing access of foreign matter to the liquid of the seal. A further object of my invention is to provide a gas regulator with an improved type of valve which will be effective in operation and very durable.

I accomplish the above objects by mounting the regulator valve in a flanged coupling which is attached to a regulator casing and which receives the gas inlet pipe. To prevent access of foreign matter to the liquid seal, I provide the passage from the regulator casing to the seal with a pocket or depression in which foreign matter will be deposited.

The accompanying drawing illustrates my invention: Fig. 1 is a central section through a gas regulator embodying my invention; Fig. 2 is a perspective view showing my gas regulator with the top removed and the valve seat separated from the regulator casing; Fig. 3 is a fragmental section similar to Fig. 1 but on an enlarged scale showing details of the liquid seal I prefer to employ; Fig. 4 is a central section through the flanged coupling containing the valve seat, such figure showing the valve in position on the coupling; and Fig. 5 is a perspective view of my improved valve in an inverted position.

My gas regulator comprises a casing 10, a casing cover 11, and a diaphragm 12 which lies between the casing 10 and the cover 11 and is held in place by any suitable means which may be employed to hold the cover and casing together. The casing 10 is provided with inlet and outlet openings, the former of which is controlled by a valve 13. The diaphragm 12 is preferably clamped between an upper rigid disk 14 and a lower disk 15 by means of a screw 16. The disk 15 is provided with a depending projection 17 through a hole in which there extends one end of a lever 18 which is pivotally mounted in the casing 10 as by trunnions 19. The lever 18 serves to interconnect the valve 13 and the diaphragm 12 so that the valve 13 will be closed when the pressure within the casing 10 equals or exceeds a predetermined value. To regulate the pressure at which the valve 13 is closed, I provide a screw plug 21 in a boss 22 on the cover 11, and I interpose between the plug 21 and the diaphragm a coil spring 23. By altering the position of the plug 22 the force exerted on the diaphragm by the coil spring 23 may be varied and by this means the pressure at which the valve 13 closes may be regulated.

The valve 13 is mounted in a coupling 25 having a flange 26 which is provided with a plurality of holes 27 for the reception of bolts 28 which pass through the flange 26 and a corresponding flange 29 on the casing 10. The coupling 25 is provided with an axial threaded bore for the reception of the gas inlet pipe 30. In its upper face, the coupling 25 is provided with a relatively deep annular groove 31 which surrounds the valve seat 32 and with a relatively shallow recess which receives the valve 13. The valve 13 is formed from a sheet of flexible material such as leather which is preferably slightly thicker than the depth of the recess in which it lies. The valve 13 is provided with an arcuate slot 33 which separates from the outer portion of the valve an inwardly projecting tongue 34 which is adapted to overlie the valve 32. To increase the sensitivity of the valve, I prefer to cut a groove 35 partially through the leather of the valve at the point where the tongue 34 joins the outer portion of the valve.

To provide the valve with an abutment for the lever 18 to engage, I mount centrally in the tongue 34 a metal plug 36 which extends upward from such tongue into engagement with the end of the lever 18. The lower face of the plug 36 is recessed to receive a disk 37 which engages the valve seat 32. The disk 37 is preferably made of hard fiber or some similar material.

In addition to the inlet and outlet openings referred to above, the casing 10 is provided with an escape opening which communicates with an escape pipe 40. Communication between the interior of the casing 10 and the escape opening is by way of a passage 41, but flow of gas through the passage 41 to the escape opening is normally prevented by a liquid seal. The passage 41 extends downwardly from the interior of the casing 10 into communication with a recess 42 in which the liquid seal is located. The lower end of the recess 42 is closed by means of a plug 43 which on its upper face is provided with a central cylindrical boss 44 which fits tightly within an upwardly projecting tube 45 which is not of sufficient length to reach the top of the recess 42. Secured in the casing 10 and extending downwardly into the tube 45 is a second tube 46 which is sufficiently smaller than the tube 45 to provide an annular space between the two tubes. The tube 46 is so arranged that its lower end is slightly above the upper surface of the boss 44 in order to provide a path of communication between the interior of the tube 46 and the space between the tubes 45 and 46. Across the escape opening in the casing 10 there extends a rib 50 which is provided with a central threaded hole for the reception of a screw 51 which extends upward through the plug 43 and holds such plug in place against the casing 10. Preferably, the screw 51 is surrounded by a tube 52 which fits tightly within an axial hole in the plug 43. A liquid such as mercury is placed within the tube 45, sufficient of the liquid being employed so that its upper surface is above the lower end of the tube 46.

This liquid normally prevents any outflow of gas through the passage 41 and the escape pipe 40, but if for any reason the valve 13 should leak and permit the building up of an excess pressure within the interior of the casing 10, the liquid will be displaced into the tube 46 and will permit the escape of gas through the passage 41 and escape pipe 40. The annular space about the tube 45 forms a pocket for the reception of any solid matter passing through the tube 41 and prevents any such solid matter from reaching the liquid within the tube 45. The rib 50, in addition to receiving the screw 51, serves also as a baffle to prevent the escape of mercury from the seal.

To insure free movement of the diphragm 12 under the influence only of the gas pressure below it and the spring pressure above it, the space within the cover 11 must be vented. This may readily be accomplished by means of a passage 55 in the cover 11, which passage 55 communicates with the passage 56 in the casing 10 leading to the escape opening above the liquid seal.

To obtain easy access to the valve 13 for the purpose of cleaning it, I prefer to employ the arrangement of pipes illustrated in Fig. 2. In this arrangement, a short length of pipe 60 connects the coupling 25 with a horizontal pipe 61 which in turn is connected through the elbows 62 and 63 with a gas supply pipe 64. When it is desired to separate the coupling 25 from the casing 10 to obtain access to the valve, it is only necessary to remove the nuts from the bolts 29 and to rotate the pipes 60 and 61 about the common axis of the elbows 62 and 63 to the position illustrated in Fig. 2. The valve may then be removed and the valve and valve seat cleaned. When the valve is replaced in the coupling 25, the pipes 60 and 61 can be rotated to bring the flange 26 against the flange 29 and the coupling 25 may then be bolted to the casing 10 by means of the bolts 28.

I claim as my invention:—

1. A fluid pressure regulator, comprising a casing having an inlet and an outlet, a pressure-responsive element in said casing, a coupling member adapted to receive a fluid supply pipe, means for holding said coupling member in position on said casing at the inlet thereof, said coupling member having a valve seat, a valve member of flexible material arranged to overlie said valve seat, a metal member inserted in said valve member above said valve seat, said metal member being provided with a replaceable disk in position to engage said valve seat, and a lever pivotally mounted in said casing in position to engage said metal member, said lever being connected to said pressure-responsive element.

2. A fluid pressure regulator, comprising a casing having an inlet and an outlet, a valve for controlling said inlet, a pressure-responsive element for controlling said valve, a downwardly opening recess in said casing, a passage connecting said recess with the interior of said casing, a fluid escape opening for said recess, a cup for closing said recess, means for holding said cup in position on said casing, a tube communicating with said fluid escape opening and extending downwardly into said cup, and liquid in said cup, said tube extending into said liquid.

3. A fluid pressure regulator as set forth in claim 2 with the addition that said cup is spaced from the walls of said recess to provide an annular space for the interception of foreign matter passing out of said casing.

In witness whereof, I have hereunto set my hand at Indianapolis, Indiana, this 21st day of December, A. D. one thousand nine hundred and twenty five.

ARTHUR L. PICKERING.